A. SMITH.
LIGHTERING VESSEL.
APPLICATION FILED MAR. 23, 1912.
1,090,659.
Patented Mar. 17, 1914.
4 SHEETS—SHEET 1.
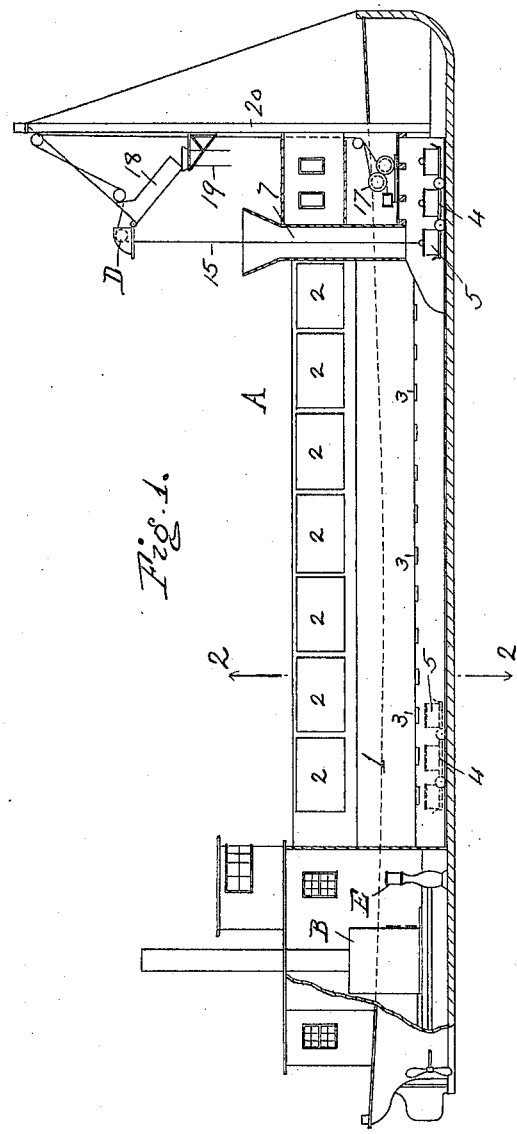
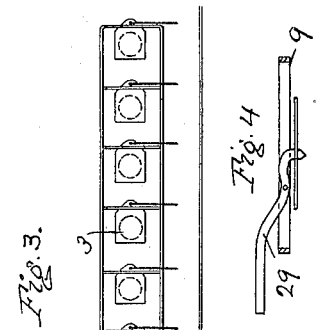
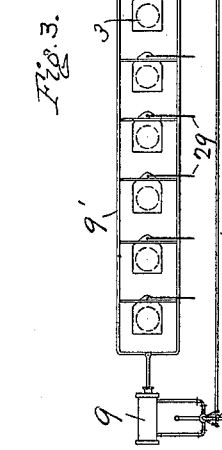
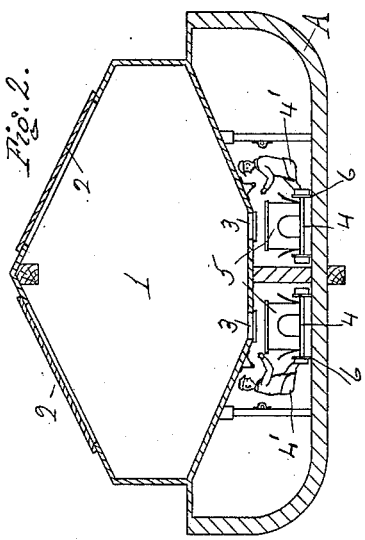
WITNESSES:
M. E. Keir
L. H. Grote
INVENTOR
Augustus Smith
BY
Howson and Howson
his ATTORNEYS A. SMITH.
LIGHTERING VESSEL.
APPLICATION FILED MAR. 23, 1912.
1,090,659.
Patented Mar. 17, 1914.
4 SHEETS—SHEET 2.
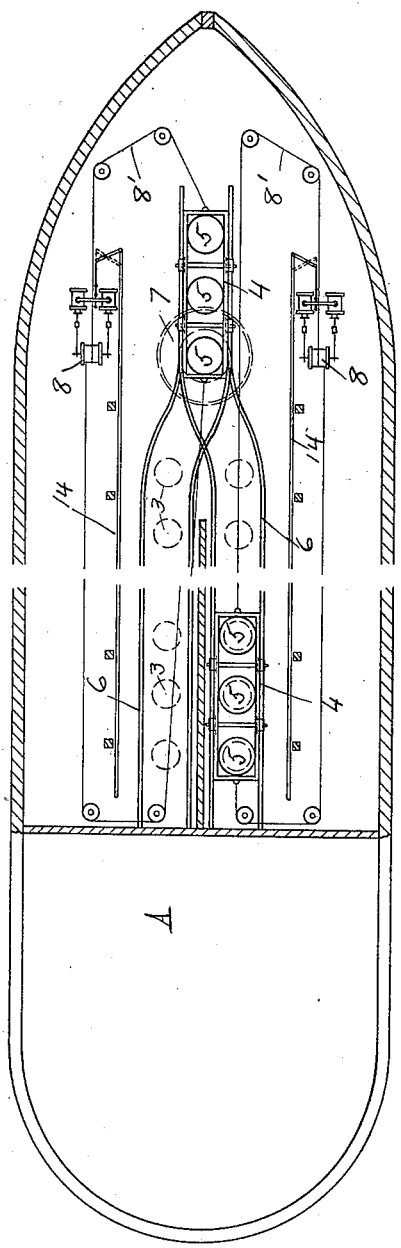

A. SMITH.
LIGHTERING VESSEL.
APPLICATION FILED MAR. 23, 1912.
1,090,659.
Patented Mar. 17, 1914.
4 SHEETS—SHEET 3.
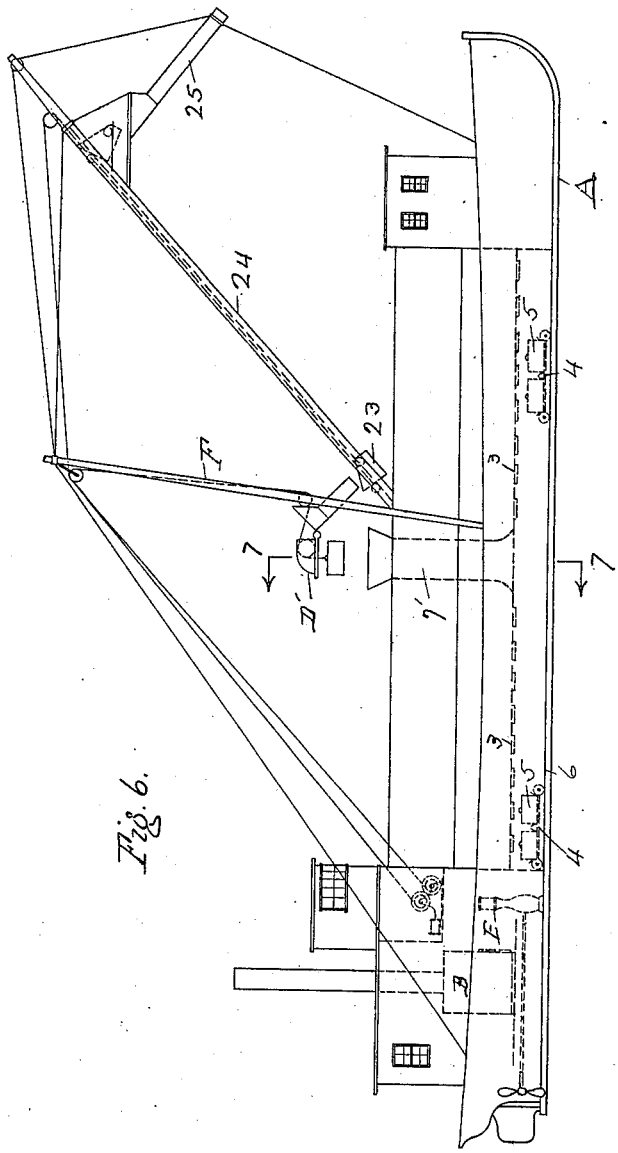
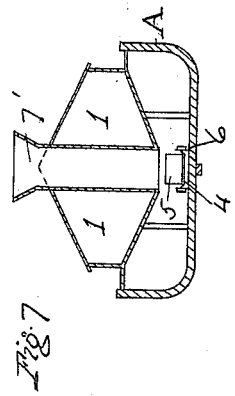
WITNESSES:
M. E. Keir
L. H. Grote
INVENTOR
Augustus Smith
BY
Howson and Howson
his ATTORNEYS

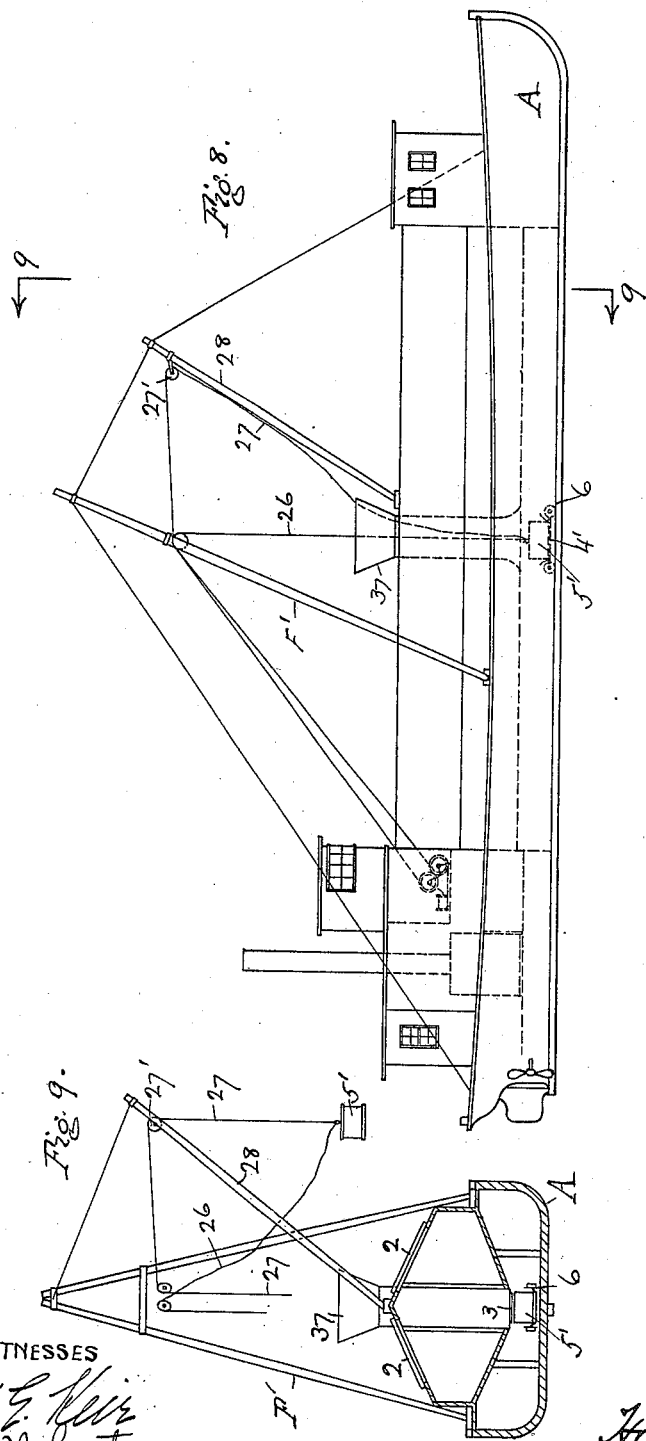

UNITED STATES PATENT OFFICE.

AUGUSTUS SMITH, OF BAYONNE, NEW JERSEY.

LIGHTERING VESSEL.

1,090,659.　　　　Specification of Letters Patent.　　Patented Mar. 17, 1914.

Application filed March 23, 1912. Serial No. 685,817.

*To all whom it may concern:*

Be it known that I, AUGUSTUS SMITH, a citizen of the United States of America, residing in the city of Bayonne, in the county of Hudson and State of New Jersey, have invented a certain new and useful Improvement in Lightering Vessels, of which the following is a specification.

Lightering vessels have heretofore been constructed for the handling and discharging of coal and other granular material, some being equipped with endless conveyers and elevators, and others with grab buckets, for example.

Still other vessels have carried their cargoes in separate containers and have had means for lifting and dumping said containers successively to discharge the cargo.

Endless conveyers and elevators involve complicated and expensive means for weighing and measuring the cargo as it is discharged, and moreover, such conveyers and elevators usually require a heavy superstructure above the vessel's deck, and that is a serious obstacle to the navigation of the discharging vessel.

Grab buckets do not themselves measure their loads accurately, requiring the use of a secondary measuring device for registering the amount discharged. They are also dirty and dusty in operation and are attended with no little risk of damage by the swinging and striking of the bucket.

Separate containers involve delay at the loading point where the containers are filled, and they limit the cargo by reason of the difficulty of storing the containers in such a way that they can be lifted out conveniently to discharge the cargo. They also limit the cargo by the tare weight of the containers themselves.

My invention is designed to overcome these objections, and I accomplish the purpose by constructing a vessel to carry its cargo in a bunker, which can be readily filled at the loading point and which is arranged to discharge its cargo by gravity through gates near the bottom of the bunker into tubs or boxes below, and so arranged in relation to the gates as to automatically measure the material accurately, and which can then be hoisted by a suitable means carried by the vessel and dumped at the point where the cargo is to be discharged.

My type of vessel may or may not be equipped with its own propelling machinery though in the accompanying illustrations I have shown it so equipped.

In the accompanying drawings, Figure 1 is a longitudinal section through a vessel constructed in accordance with my invention; Fig. 2 is a transverse section on the line 2—2, Fig. 1, but drawn to a larger scale; Fig. 3 is a detached plan view of gate-opening means; Fig. 4 is a view, drawn to a larger scale, of a detail of the gate-opening means; Fig. 5 is a sectional plan view, showing the tracks and cars under the bunker; Fig. 6 is a longitudinal side elevation of another construction of vessel embodying my invention; Fig. 7 is a transverse section on the line 7—7, Fig. 6; Fig. 8 is a longitudinal side elevation of another modification; Fig. 9 is a transverse section on the line 9—9, Fig. 8.

Referring to Figs. 1 to 5, A is a floating vessel shown in the form of a self-propelled coal or grain lighter, in which the propelling engines E and boiler B are indicated in outline near the stern of the vessel.

The cargo bunker 1 is shown amidships fitted at the top with hatches 2 to protect the cargo from the weather. The bottom of the bunker slopes from each side toward the center, where are provided two longitudinal series of outlet openings closed by horizontal sliding gates 3. On the bottom or hull of the vessel, and immediately under these two rows of discharge gates are tracks 6 (Figs. 2 and 5) meeting in a single track under an elevator or shaft 7, toward the bow of the vessel, Fig. 1. On these tracks 6 run cars 4, each of which carries say three tubs or cans 5 or equivalent vessels, into which the coal can be drawn from the bunker through the opened gates, and which tubs in turn can be hoisted out through the shaft 7.

I prefer to provide two cars 4, one for each track, and each car is provided with a suitable seat $4^1$ on the side, Fig. 2, to permit a man to ride thereon. Each car is connected to a small reversible winding engine 8, by an endless rope $8^1$, Fig. 5, and any suitable means are provided whereby the man riding on the car can control the throttle and reversing mechanism of his engine 8, connected to his car, so as to cause the car to travel in one direction or the other and stop and start at will.

Any desired one of each series of gates or slides 3 at the bottom of the bunker 1 may be opened or closed under the control of the man on the car by suitable means. In Fig. 3, I have shown for each row of gates a steam ram 9, controlled by a reversing throttle valve 10, which may be operated by a rock shaft 11 extending alongside the passage way in which the car 4 travels, so that the man on the car may easily reach the rock shaft and turn it to work the valve from his seat on the car. There are, of course, two of these rams, one for each set of gates. To the piston of each ram is connected a steel frame $9^1$, carrying pivoted latches 29, Figs. 3 and 4, one for each gate 3, and so arranged that the man can cause any latch to engage the particular gate 3, which it controls. For the sake of simplicity and because of the necessary smallness of scale, I have not shown this frame $9^1$ in Fig. 1.

When the steam ram 9 is brought into play to push or pull the sliding frame $9^1$, any gate or slide latched to it will be opened or closed, as the case may be. The tub car man having brought his car fairly under any of the selected gates, as shown for example by dotted lines at the left of Fig. 1, he thereupon engages the slides of those gates with the frame $9^1$ by means of their respective latches and turns steam on to the ram which forthwith pushes the frame $9^1$ carrying the particular slides latched to it, thus opening the selected gates and allowing part of the cargo to fall into the tubs carried by the car. The position and dimension of the tub are so taken in relation to the gate that the material will not overflow like water, but when the tub is filled to a prescribed height, depending on the angle of repose or internal friction of the material of the cargo, the flow will stop. The car man then reverses the steam ram 9, which closes the gates 3, cutting through the column of material extending down from the bunker into the bottom of the tub without spilling, and so measures with substantial accuracy the quantity taken in each tub. The tubs or cans are all made the same size, and the volume carried by the tubs can be converted into weight by weighing a few of the tubs taken as samples. The man on the car having closed the gates, now operates the winding engine connected to his car as above described, by means of a connection from the throttle convenient to his hand, as for instance by a wooden push rod 14. By this means the car man can cause the car with its loaded tubs to move forward to the well 7 under the hoisting mechanism. Arriving at the hoist, the tubs are successively hooked to a fall 15 which is shown in Fig. 1 as dropping from a single rope "Morris dumper" D, (such as described more fully under Patent No. 699,806), on the mast 20 and running thence to a hoisting engine 17. The tubs are thus successively hoisted and dumped into a chute 18 which is shown in Fig. 1 as connected to a swinging telescopic delivery chute 19 to deliver the cargo finally to any point within its reach. In this vessel the whole dumper may be adjusted vertically to any desired position on the mast 20, to discharge at the required point.

In the modified construction of discharging vessel shown in Figs. 6 and 7, there is a single track 6 along the middle of the vessel under a row of gates 3 under the bunker, and the hoist well $7^1$ is shown as placed about midway of the length of the bunker or cargo space. The two steam rams to actuate the gates will in this case be at opposite ends of the cargo space, one to control the gates forward of the hoist well $7^1$ and the other to control the gates aft of the well $7^1$. To avoid confusion and owing to the reduced scales to which these views are drawn, representation of the rams and frames is omitted, their construction and operation being substantially as described with reference to Figs. 3 and 4. The modified arrangement here described, like that of Figs. 1 to 4, permit one car to have its tubs unloaded at the hoist well $7^1$, while the other car is being loaded from the bunker. In this modification, Figs. 6 and 7, the Morris dumper $D^1$ is shown at the bottom of the mast or A-frame F arranged to dump into a skip bucket 23, which can be made to travel up and down a track way in the form of a boom 24. On this boom will be mounted a delivery chute 25 with enlarged upper end, and into which the skip bucket can be dumped. This delivery chute can be adjusted to any desired position along the length of the boom 24 to permit the cargo to be discharged at any point within the limits of its travel.

In Figs. 1 and 6, a single rope Morris dumper has been shown, but it will be understood that a double rope Morris dumper, such as described in Patent No. 665,574 may be used, or any other suitable dumping or discharging means available in its place. Thus in the modification shown in Figs. 8 and 9, the Morris dumper is dispensed with. Instead, each filled tub $5^1$ is in this case hoisted by a vertical fall rope 26 and when the tub has been hoisted clear of the shaft 37, it is swung clear outboard by another fall 27 attached to the hoisting hook and running over a pulley $27^1$ carried by a boom 28 in the manner well known. The tubs can be emptied either by capsizing them or by opening flap doors in the bottom.

Other modifications can be made in the apparatus without departing from my invention, important features of which are the construction of the vessel to carry a cargo of granular material in a bunker above the bottom of the vessel, the bunker being provided with gates through which the cargo can be discharged by gravity into tubs or the like, which are so arranged in relation to the gates as to automatically measure the material with substantial accuracy, without spilling, and which can be afterward hoisted and then dumped at the point where cargo is to be delivered.

I claim as my invention,

1. A lightering vessel, having a bunker for granular cargo, sliding discharge gates in the bottom of the bunker, traveling cars with removable tubs under the bunker to receive the cargo from the bunker through open gates, the tubs being of such size and relation to the gates that the flow will cease when a certain quantity has entered the tub, means for closing the gates so that the tubs can then be withdrawn, and means for hoisting the tubs off the cars when moved from below the bunker, substantially as described.

2. A lightering vessel, having a bunker for granular cargo, sliding discharge gates in the bunker, traveling cars with removable tubs under the bunker to receive the cargo from the bunker, power means to open the gates under control of the operator and power means on the vessel for hoisting the tubs from below the bunker, substantially as described.

3. A lightering vessel, having a bunker for granular cargo, sliding discharge gates in the bunker, traveling cars with removable tubs under the bunker to receive the cargo from the bunker through opened gates, power means to open the gates, a vertical hoisting well, and power means on the vessel for hoisting the tubs off the cars, when moved from below the bunker, through the well and for discharging their contents, substantially as described.

4. A bunker provided with a series of sliding discharge gates in combination with a horizontally slidable frame, a motive power means to reciprocate the sliding frame, and means to connect any of the gates with said sliding frame to operate the selected gates.

In testimony whereof I have signed my name to this specification in the presence of two subscribing witnesses.

AUGUSTUS SMITH.

Witnesses:
G. W. MARTLING,
HUBERT HOWSON.

---

Copies of this patent may be obtained for five cents each, by addressing the "Commissioner of Patents, Washington, D. C."